United States Patent
Jacobson (10) Patent No.: US 6,785,604 B2
(45) Date of Patent: Aug. 31, 2004

(54) DIAGNOSTIC SYSTEMS FOR TURBOCHARGED ENGINES

(75) Inventor: Evan Earl Jacobson, Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 63 days.

(21) Appl. No.: 10/144,738

(22) Filed: May 15, 2002

(65) Prior Publication Data

US 2003/0216856 A1 Nov. 20, 2003

(51) Int. Cl.[7] .............................................. G06F 19/00
(52) U.S. Cl. ...................................... 701/114; 701/115
(58) Field of Search .......................... 701/99, 100, 101, 701/114, 115; 706/15

(56) References Cited

U.S. PATENT DOCUMENTS

| | | | |
|---|---|---|---|
| 4,128,005 A | 12/1978 | Arnston et al. | |
| 4,277,830 A | 7/1981 | Reid et al. | |
| 4,496,286 A | 1/1985 | Gagnon | |
| 4,604,701 A | 8/1986 | Fujawa et al. | |
| 5,027,647 A | 7/1991 | Shimanaka | |
| 5,526,266 A | 6/1996 | Rutan et al. | |
| 5,546,795 A | 8/1996 | Yamagishi | |
| 5,585,553 A | 12/1996 | Schricker | |
| 5,698,780 A | 12/1997 | Mizutani et al. | |
| 5,808,189 A | 9/1998 | Toyoda | |
| 5,890,468 A | 4/1999 | Ozawa | |
| 6,209,390 B1 | 4/2001 | LaRue et al. | |
| 6,236,908 B1 | 5/2001 | Cheng et al. | |
| 6,240,343 B1 | 5/2001 | Sarangapani et al. | |
| 6,298,718 B1 * | 10/2001 | Wang ........................ | 73/118.1 |

* cited by examiner

*Primary Examiner*—John Kwon
(74) *Attorney, Agent, or Firm*—Finnegan, Henderson, Farabow, Garrett & Dunner (57) ABSTRACT

A method, system, and machine-readable storage medium for diagnosing operation in a turbocharged engine having an engine control module (ECM) operable to control engine operation in response to data received from a plurality of sensors is disclosed. In operation, the method, system, and machine-readable storage medium store data corresponding to a compressor map defining a region of compressor efficiency and compressor speeds during operation, and a turbine map defining a region of turbine efficiency and turbine speeds during operation. Next, the method, system and apparatus determine a predicted value for an operating parameter using data received from selected ones of the plurality of sensors and the data stored in memory, determine an actual value for the operating parameter using data received from selected ones of the plurality of sensors, and generate an abnormal operation signal if a difference between actual and predicted values is greater than a predetermined amount.

23 Claims, 9 Drawing Sheets

DIAGNOSTIC SYSTEMS FOR TURBOCHARGED ENGINES

TECHNICAL FIELD

The present invention relates to turbocharger diagnostic systems and, more particularly, to systems and methods for diagnosing abnormal performance within turbocharged engines.

BACKGROUND

Under certain operating conditions, a turbocharger in an internal combustion engine improves overall engine efficiency and provides increased power, particularly during vehicle acceleration. In operation, radial inflow turbines are driven by engine exhaust gas. The turbine then drives a radial compressor that increases the pressure of intake air provided to the engine. The increased density of the intake air enhances the combustion process, resulting in a higher output of power.

When the turbocharger is not functioning properly, turbine efficiency may be lowered, the engine may operate unstably, and in extreme cases, engine damage may result. Engine designers have therefore been particularly interested in closely monitoring the operation of the turbocharger in an effort to identify problems before they impact engine performance. It is known to evaluate turbochargers against the left and right boundaries (i.e., a surge line and a choke line, respectively) of a turbine map associated with the turbine, or a compressor map associated with compressor. Both of these lines define bounds for desired operation of the turbocharger or the compressor. Compressor maps and turbine maps depict identical information (i.e., efficiency and speed) for compressors and turbines, respectively. Monitoring turbocharger performance based on either component will likely lead to identical results. As an example, U.S. Pat. No. 6,298,718 to Wang discloses a turbocharger compressor diagnostic system in which compressor performance is compared to surge and choke regions on a compressor operation map. If compressor performance data falls into either the surge or choke regions, an abnormal performance signal is generated. However, overcoming surge and choke conditions may impact engine performance and fuel economy. Exacerbating the problem is the fact that the area between the surge and choke regions can be quite significant, particularly as the inlet flow increases. Thus it is possible that turbocharger efficiency may be precipitously declining, indicating a fault, but the turbocharger's performance may nevertheless remain between the surge and choke lines. Monitoring turbocharger performance on such a gross scale may have been adequate in the past, but it is no longer sufficient for identifying turbocharger anomalies in modem internal combustion engines before they impact engine performance or cause substantial damage.

Moreover, in the past, the identification of a compressor abnormal operating condition was achieved using data from sensors throughout the engine. If the data was suspect due to a failed sensor, an abnormality may be misdiagnosed, or simply missed. It is therefore important to verify the information used to determine the existence of a turbocharger anomaly. It is equally important to have a turbocharger diagnosis system and method that provides an accurate measure of the turbocharger performance.

SUMMARY OF THE INVENTION

A method for diagnosing operation in a turbocharged engine having an engine control module (ECM) operable to control engine operation in response to data received from a plurality of sensors is disclosed. In operation, the method stores data corresponding to: a compressor map defining a region of compressor efficiency and compressor speeds during operation; and a turbine map defining a region of turbine efficiency and turbine speeds during operation. Next, the method determines a predicted value for an operating parameter using data received from selected ones of the plurality of sensors and the data stored in memory, determines an actual value for the operating parameter using data received from selected ones of the plurality of sensors, and then generates an abnormal operation signal if a difference between actual and predicted values is greater than a predetermined amount. An apparatus and a machine-readable medium are also provided to implement the disclosed method.

DETAILED DESCRIPTION

For the purposes of promoting an understanding of the principles of the invention, reference will now be made to the embodiments illustrated in the drawings and specific language will be used to describe the same. It will nevertheless be understood that no limitation of the scope of the invention is thereby intended. The invention includes any alterations and further modifications in the illustrated devices and described methods and further applications of the principles of the invention that would normally occur to one skilled in the art to which the invention relates.

Figure 1:
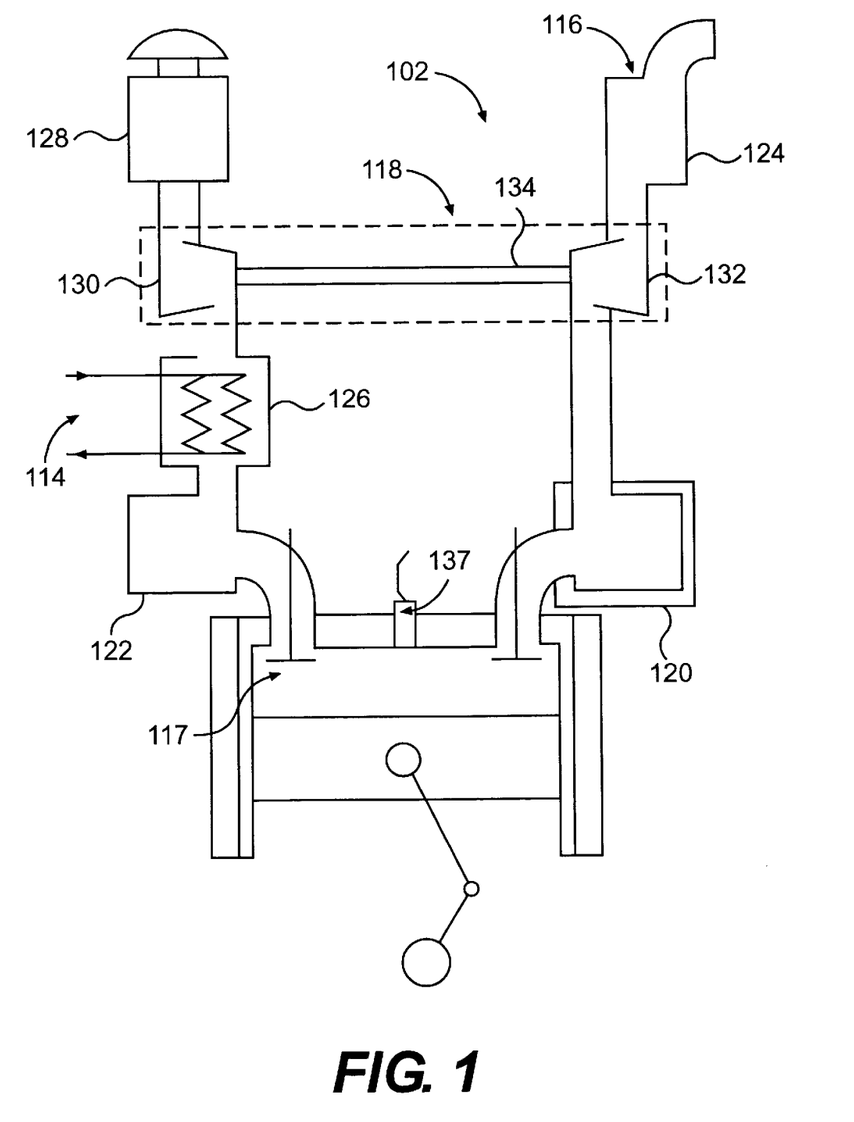
FIG. 1 is a diagrammatic and schematic representation of an engine that may utilize aspects of the present invention.

With reference to FIG. 1, the present invention is adapted to monitor and control an engine 102. As shown in FIG. 1, engine 102 includes an air intake system 114, an exhaust system 116, a combustion system 117, and a turbocharger 118. The air intake system 114 typically includes an air filter or cleaner 128, an aftercooler 126, and an air intake manifold 122. The exhaust system 116 typically includes an exhaust manifold 120 and a muffler 124. The combustion system 117 typically includes elements such as a piston and combustion chamber as is known in the art, including free piston and rotary engine designs.

The turbocharger 118 includes a compressor 130, a turbine 132, and a shaft 134. The compressor 130 is connected into the air intake system 114 between the aftercooler 126 and the air filter 128. The turbine 132 is connected into the exhaust system 116 between the exhaust manifold 120 and the muffler 124. The shaft 134 connects the compressor 130 to the turbine 132. Air is drawn into the compressor 130 through air intake system 114 and provided to combustion system 117 by way of an air intake manifold 122. Exhaust gas from the engine passes through exhaust manifold 120 to drive the turbine 132, as is well known to those skilled in the art.

Engine 102 typically includes a plurality of sensors (not shown) operable for sensing a variety of operating parameters of the engine, such as, but not limited to; barometric pressure, inlet ambient temperature, intake manifold temperature/pressure, pilot quantity, injection duration, engine speed, rate of fuel delivery to the engine, ratio of air to fuel delivery to the engine, fuel quantity, the oil pressure, oil temperature, engine speed and exhaust temperature. Turbocharger 118 may include sensors for sensing the compressor outlet temperature/pressure, turbine inlet temperature/pressure, and the boost pressure. All of the sensors can be of a variety of designs known in the industry.

Figure 2:
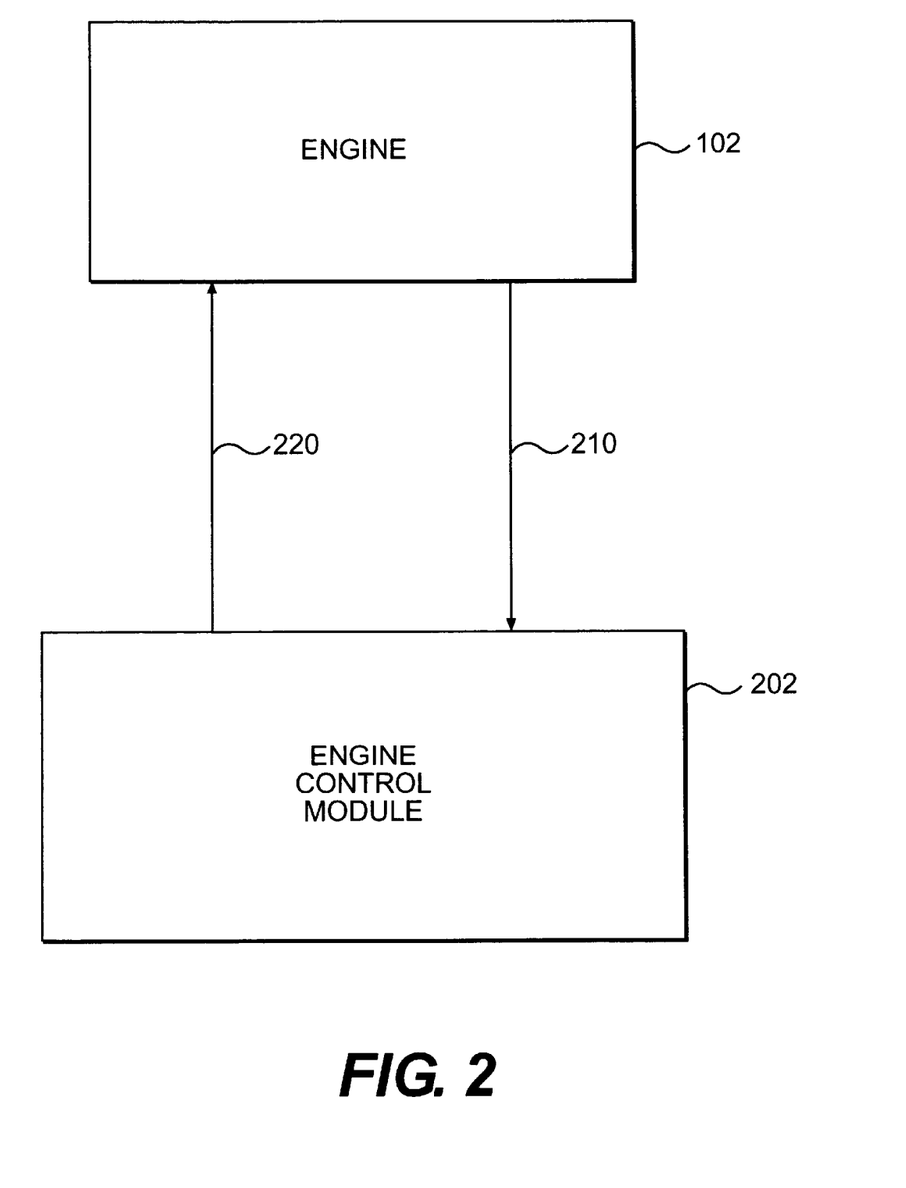
FIG. 2 is a diagrammatic representation of an Engine Control Module (ECM) and engine.

The operation of engine 102 is governed by an engine control module (ECM) 202, as shown in FIG. 2. Sensor output signals 210 are transmitted to ECM 202 from engine 102. ECM 202 then generates control signals 220 in response to the sensor output signals. Once generated, control signal 220 is then passed from ECM 202 to engine 102 to control engine operation.

Figure 3:
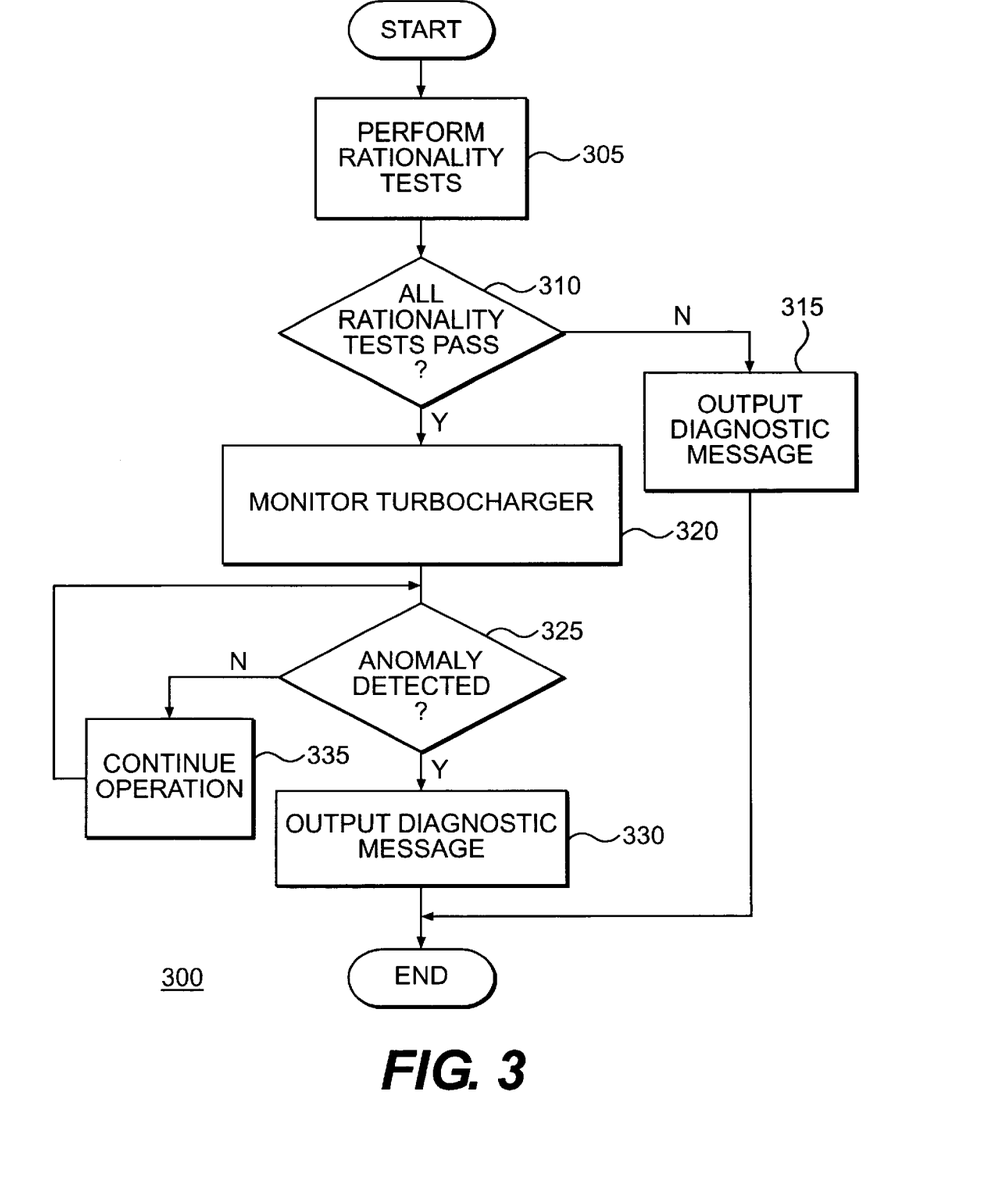
FIG. 3 is a flowchart showing the general operation of an exemplary embodiment of the present invention.

Referring now to FIG. 3, there is shown a high-level flow chart of the steps performed in one exemplary embodiment. As shown, system 300 first conducts rationality tests to determine whether the sensor data received by ECM 202 is accurate (step 305). Examples of the rationality test are discussed in more detail below. If at least one rationality test fails (step 310), processing flows to step 315, and a diagnostic message is outputted. If the rationality tests pass, processing flows to step 320 where the present system monitors turbocharger 118. If the turbocharger is operating properly (step 325), processing continues (step 335). If the turbocharger is not operating properly, a diagnostic message is outputted (step 330).

Figure 4:
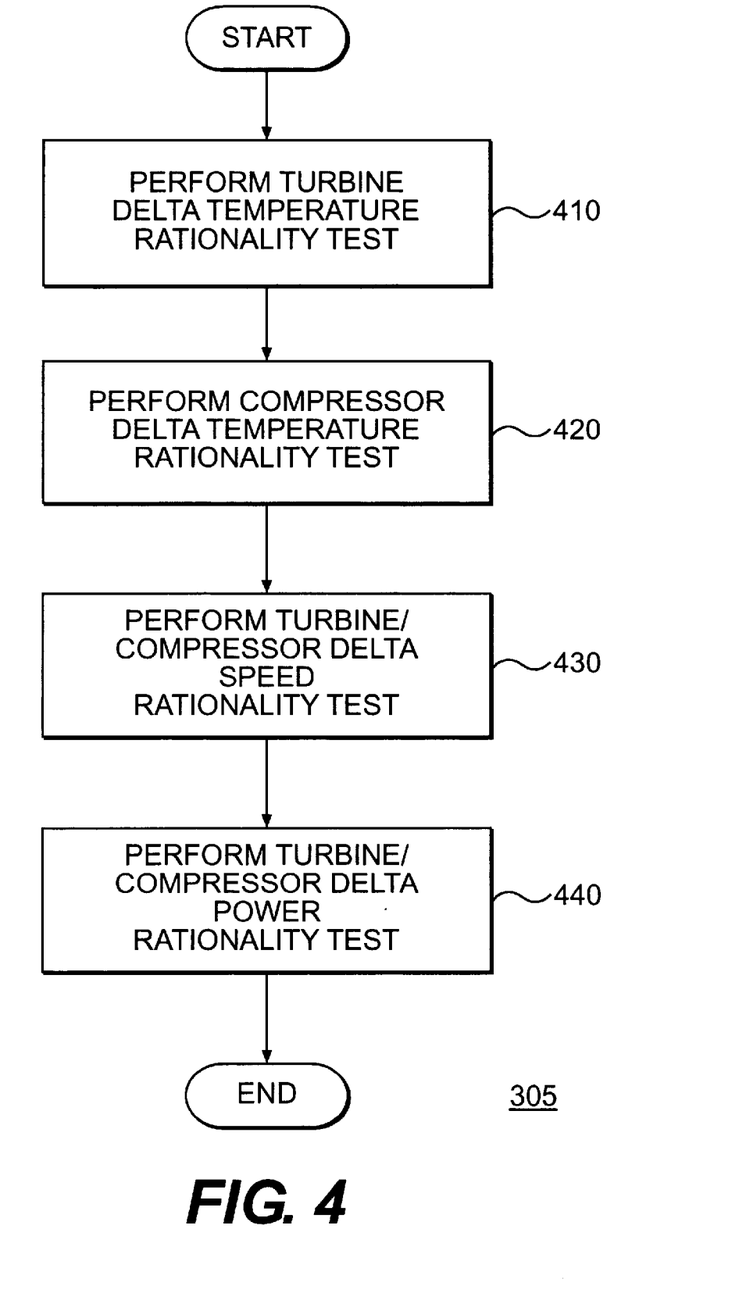
FIG. 4 is a flowchart of the algorithm for performing rationality tests in accordance with an exemplary embodiment of the present invention.

Referring to FIG. 4, there is shown a more detailed flow chart of the steps for performing exemplary rationality tests depicted in step 305 of FIG. 3. As shown, the first rationality test performed is a turbine delta temperature rationality test (step 410). If that test is successful, processing flows to step 420. Otherwise, a diagnostic routine or error message is invoked. In step 420, the present invention performs a compressor delta temperature rationality test. If that test is successful, processing flows to step 430. Otherwise, a diagnostic routine or error message is invoked. Step 430 performs a combined turbine/compressor delta speed rationality test. Since turbine 130 and compressor 132 share a common shaft 134, their relative speeds should fall within a predetermined error limit. If the values from step 430 are not within acceptable limits, a diagnostic routine is invoked. If the values are within the predetermined error limit, processing flows to step 440 where a combined turbine/compressor delta power rationality test is performed. If the combined turbine/compressor delta power rationality test is not successful (step 440), a diagnostic routine or error message is invoked. The software flow, as described above, is for illustration purposes only. The flow may continue serially from the first rationality test to the last rationality test, and the order of the rationality tests may be altered. In some cases, later tests may rely on values obtained in earlier tests. Consequently, if a test fails, meaning that the sensor has failed or its data is suspect, control exits the normal flow and proceeds on a "fail" loop (not shown) to an error/diagnostic message step. It is contemplated that the order of certain described rationality tests may be changed, tests may be omitted and additional rationality tests may be added in alternative embodiments.

Figure 5:
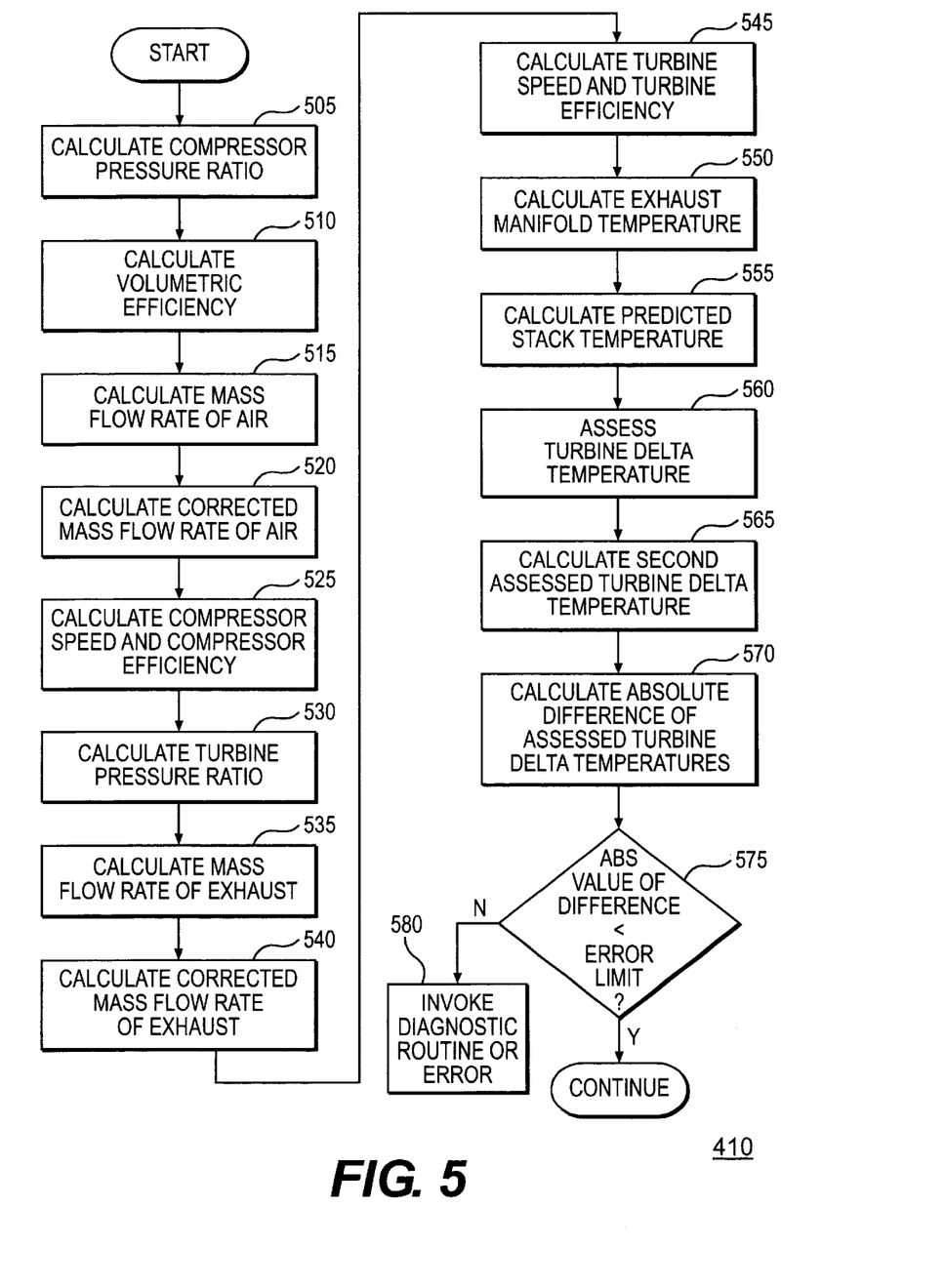
FIG. 5 is a flowchart of the algorithm for performing a turbine delta temperature rationality test in accordance with an exemplary embodiment of the present invention.

Referring now to FIG. 5, there is shown a detailed flow chart of the steps of an exemplary method for performing the turbine delta temperature rationality test as depicted in step 410 of FIG. 4 according to one exemplary embodiment of the invention. Although specific engines with environmental characteristics are disclosed for determining various operating characteristics (e.g., boost pressure, engine speed, inlet manifold temperature and fuel quantity are used to determine volumetric efficiency) other appropriate ways known to those of skill in the art may also be used. To evaluate turbine delta temperatures, boost pressure, inlet restriction and measured atmospheric pressure may be used to determine the compressor pressure ratio (step 505). In one exemplary embodiment compressor pressure ratio may be calculated from the various values, and in another exemplary embodiment, compressor pressure ratio may be determined from a lookup table. Processing then flows to step 510 where boost pressure, engine speed, inlet manifold temperature, and fuel quantity are used to calculate volumetric efficiency. In step 515, volumetric efficiency, engine speed, inlet manifold temperature, and boost pressure are used to calculate mass flow rate of air, which can then be used with inlet ambient temperature and atmospheric pressure to calculate a value for corrected mass flow rate of air (step 520).

Processing then flows to step 525 where the corrected mass flow rate of air and the compressor pressure ratio are used to calculate a predicted compressor speed and compressor efficiency. In one exemplary embodiment, a predicted compressor speed and predicted compressor efficiency are determined by utilizing a compressor map stored in a memory, using the previously calculated values for compressor pressure ratio and corrected mass flow rate of air, and retrieving the empirical values for compressor speed and compressor efficiency from the memory.

In step 530, atmospheric pressure, exhaust restrictions, and exhaust manifold pressure are used to calculate a turbine pressure ratio. Processing then flows to step 535 where the corrected mass flow rate of air and the fuel quantity are used to calculate the mass flow rate of the exhaust. The mass flow rate of the exhaust is used in combination with the exhaust manifold temperature and the exhaust manifold pressure to calculate a corrected mass flow rate of the exhaust (step 540). The corrected mass flow rate of exhaust is then used with the pressure ratio to calculate turbine efficiency and turbine speed (step 545). In one exemplary embodiment, a predicted turbine efficiency and a predicted turbine speed are determined by utilizing a turbine map stored in memory using the previously calculated values for turbine pressure ratio and corrected mass flow rate of the exhaust, and retrieving the empirical values for turbine speed and turbine efficiency from the memory.

Next, in step 550, the isentropic stack temperature and the turbine expansion ratio are used to calculate a predicted exhaust manifold temperature, which is then used with turbine efficiency and the isentropic stack temperature to calculate a predicted stack temperature (step 555). The predicted stack temperature and the predicted exhaust manifold temperature are used to assess the turbine delta temperature in step 560. Processing next flows to step 565 where the engine speed, fuel quantity, boost pressure and inlet manifold temperature are used to calculate a second assessed turbine delta temperature. The absolute difference of the assessed turbine delta temperatures is then calculated in step 570. Processing then flows to step 575 where the absolute value is compared to a turbine delta temperature error limit. If the absolute value exceeds the limit, an error is declared and/or a diagnostic routine is invoked (step 580). If the absolute value does not exceed the limit, processing continues.

Figure 6:
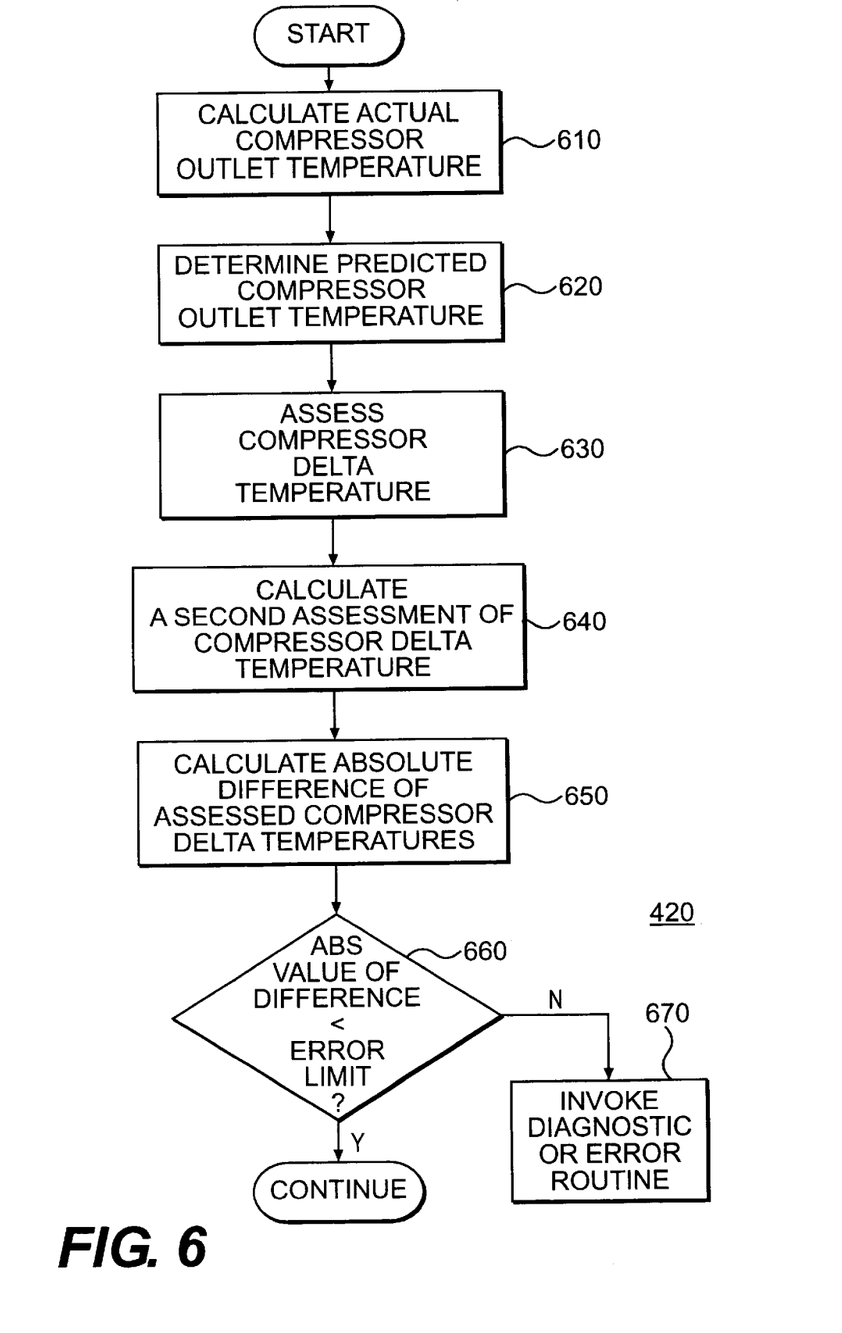
FIG. 6 is a flowchart of the algorithm for performing a compressor delta temperature rationality test in accordance with an exemplary embodiment of the present invention.

Referring to FIG. 6, there is shown a detailed flow chart of the steps of an exemplary method for performing a compressor delta temperature rationality test as depicted in step 420 of FIG. 4. In this test, the inlet ambient temperature and compressor pressure ratio are used to calculate an isentropic compressor outlet temperature (step 610). Processing then flows to step 620 where the isentropic compressor outlet temperature, the inlet ambient temperature, and the compressor efficiency are used to determine a predicted compressor outlet temperature, which is used with the inlet ambient temperature to assess compressor delta temperature (step 630). The engine speed, fuel quantity, boost pressure and inlet manifold temperature are used for a second assessment of compressor delta temperature in step 640. In step 650, the absolute value of the difference in assessed compressor delta temperature is calculated. That absolute value is compared to a compressor delta temperature error limit in step 660. If the absolute value exceeds the limit, an error is declared and/or a diagnostic routine is invoked (step 670). If the absolute value does not exceed the limit, processing continues.

Figure 7:
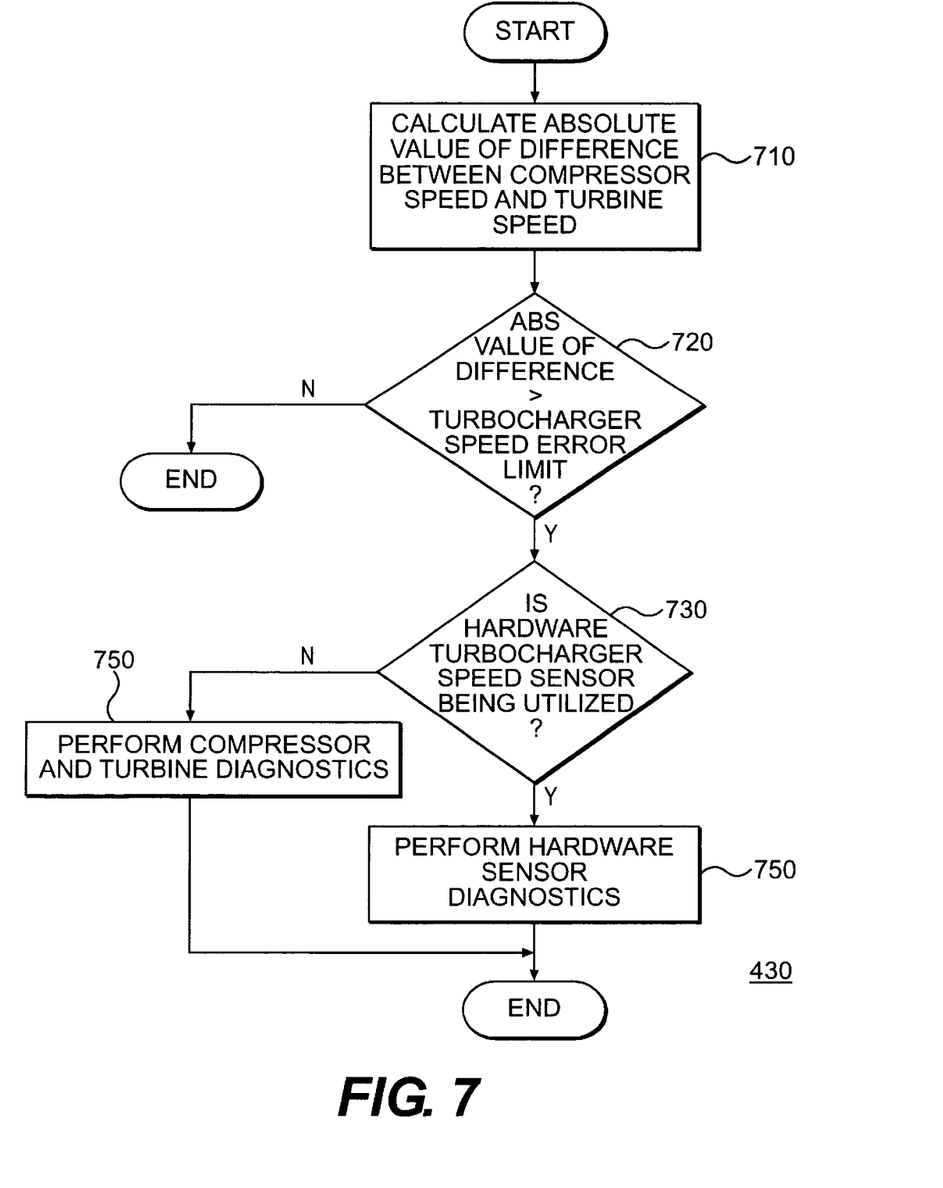
FIG. 7 is a flowchart of the algorithm for performing a turbine/compressor delta temperature rationality test in accordance with an exemplary embodiment of the present invention.

The next rationality test performed by the disclosed embodiment is the speed rationality test. The calculated compressor and turbine speeds must be within an acceptable margin of each other, as the wheels share a common shaft 134. Referring now to FIG. 7, there is shown a detailed flow chart of the steps of an exemplary method for performing a turbine/compressor delta speed rationality test as depicted in step 430 of FIG. 4. In FIG. 7, an absolute value for the difference between the previously calculated values for compressor speed and turbine speed is first computed (step 710). Processing then flows to step 720 where it is determined whether the absolute value exceeds a delta turbocharger speed error limit. If it does not exceed the limit, no fault exists. If the value does exceed the limit, processing flows to step 730 where a test is performed to determine if a hardware turbocharger speed sensor is being utilized. This information can be used to determine which speed sensor(s) is (are) in error. If a hardware turbocharger speed sensor is used, a diagnostic routine on the hardware sensor is performed (step 740). If not, processing flows to step 750 where compressor and turbine diagnostics are performed.

Figure 8:
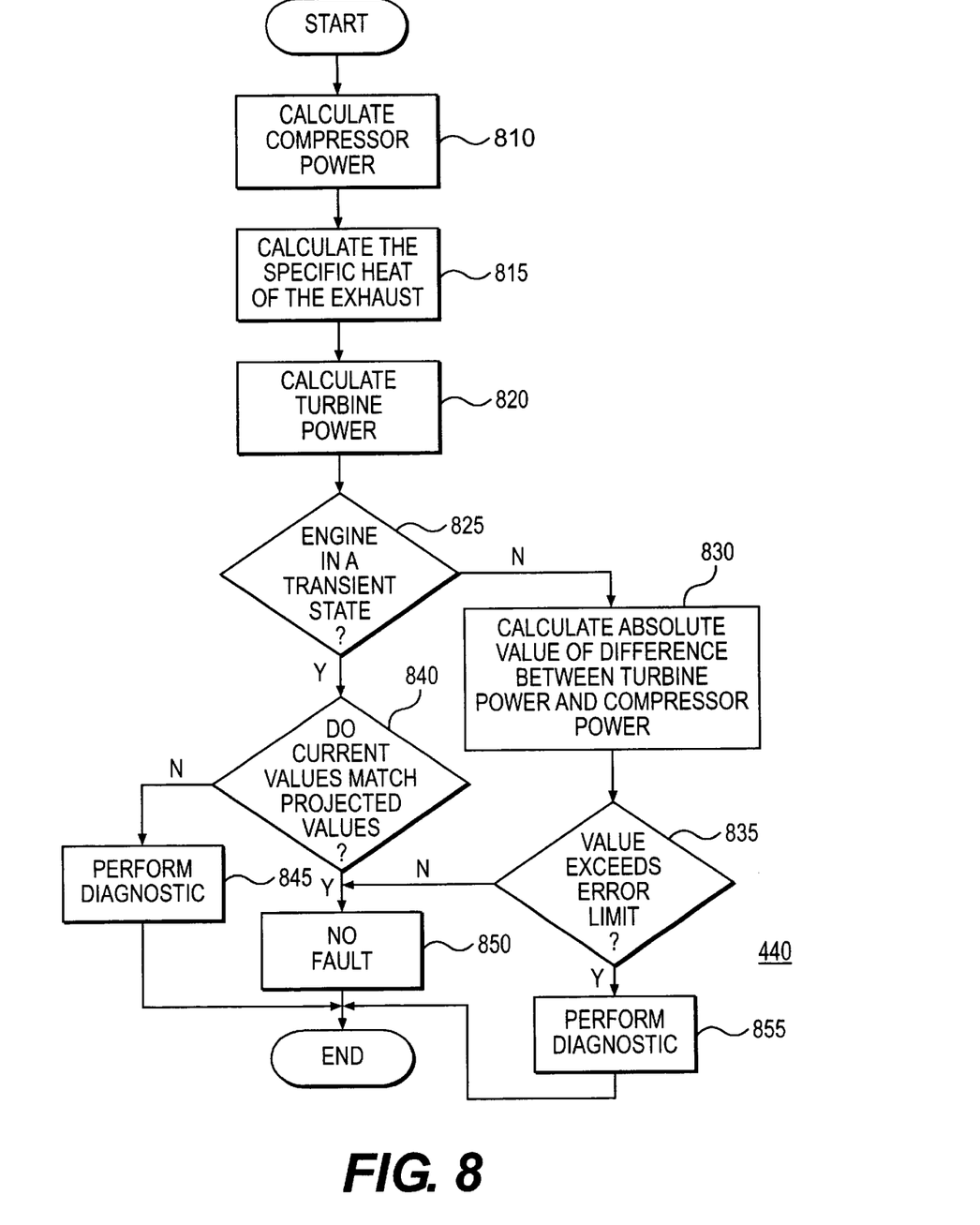
FIG. 8 is a flowchart of the algorithm for performing a turbine/compressor delta power rationality test in accordance with an exemplary embodiment of the present invention.

After the first three diagnostic tests are completed, the exemplary method then tests compressor power and turbine power to determine whether a problem exists with one of the associated sensors. Referring to FIG. 8, there is shown a detailed flow chart depicting the steps for performing an exemplary turbine/compressor delta power rationality test as depicted in step 440 of FIG. 4. In step 810, the mass flow rate of air, compressor outlet temperature, inlet ambient temperature, and the specific heat of air are used to compute compressor power. Processing then flows to step 815 where the mass flow rate of air and the fuel are used to calculate the specific heat of the exhaust. Next, mass flow rate of exhaust, exhaust manifold temperature, stack temperature, and the specific heat of the exhaust are used to calculate turbine power (step 820). Speed and fuel are used in step 825 to determine whether engine 102 is operating in transient or a steady state. If engine 102 is in a steady state, processing flows to step 830 where an absolute value of the difference between turbine power and compressor power is calculated. If the absolute value exceeds a power error limit (step 835), processing flows to step 855 and a diagnostic is invoked. If the absolute value does not exceed the limit, no fault is determined (step 850) and processing terminates. If engine 102 is in a transient state (step 825), processing flows to step 840 where inertia, compressor and turbine power history are used to determine whether current values match projected values. If they do not, a diagnostic is invoked (step 845). If the current values match projected values, within an error limit, no fault is determined (step 850) and processing terminates.

Engine 102 may include one or more hardware sensors (e.g., mass air flow, inlet ambient temperature (IAT), turbo speed, inlet manifold pressure/temperature, compressor outlet pressure/temperature, compressor delta pressure, inlet restriction, turbine delta pressure, exhaust restriction, exhaust stack temperature, and exhaust manifold temperature, etc.) such that the predicted or calculated values can be compared with output values from the hardware sensors as a further test of sensor rationality. More specifically, if engine 102 includes a hardware differential pressure sensor, its feedback can be compared with the predicted differential pressure. If the two values are within a predetermined margin of error, the hardware sensor value may used. If the two values are not within some predetermined margin of error, the predicted differential pressure value may used, and the hardware sensor will be further scrutinized to determine whether it is faulty. This same example applies with other sensors as well. For example, if an inlet ambient air temperature (IAT) hardware sensor is present in engine 102, its feedback is used to more accurately calculate turbo speed, compressor power, etc.

In another embodiment, an artificial neural network (ANN) model is used to reverse calculate one or more values computed in the described methods. More specifically, an ANN is used to compute values for engine torque, exhaust temperature, turbo speed, etc. when sufficient training data is available. Those computations are compared to calculations previously described to confirm the values or to isolate a faulty sensor. In those operating scenarios in which no training data is available, a comparison of the performed calculations together with output from an ANN may prove to be more accurate than either system alone.

Figure 9:
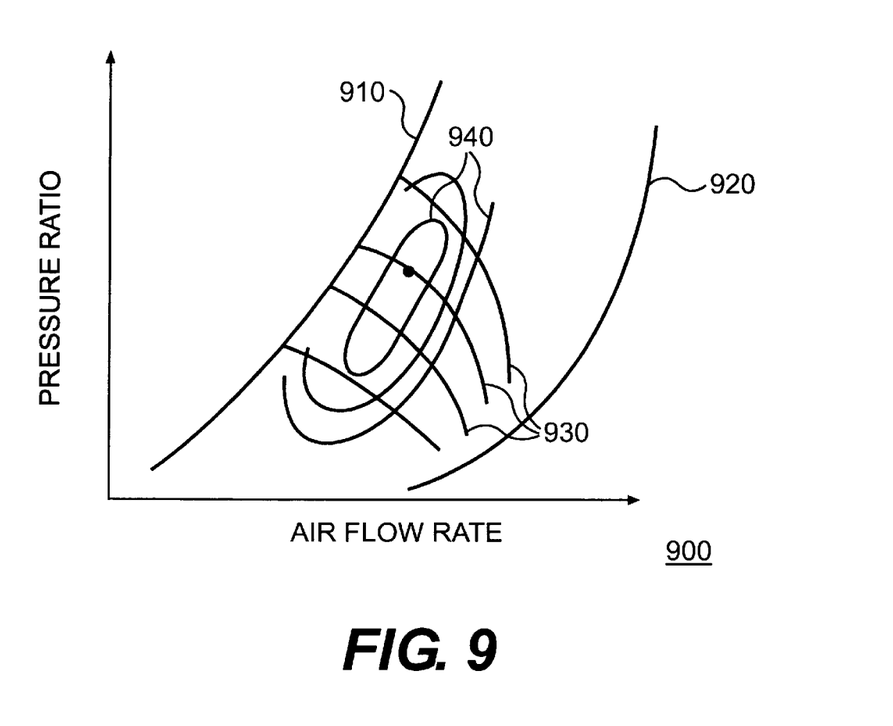
FIG. 9 is a graph depicting the performance of the compressor element of a typical turbocharger.

When each of the described rationality tests is passed, control in the system 300 flows to step 320 (FIG. 3) for evaluation of the turbocharger operation. The operating behavior of a compressor within a turbocharger is graphically illustrated by a "compressor map" associated with the turbocharger in which the pressure ratio (compression outlet pressure divided by the inlet pressure) is plotted on the vertical axis and the flow is plotted on the horizontal axis. Referring to FIG. 9, there is shown a map 900 depicting the performance of the compressor element of a turbocharger represented by a pressure ratio versus air flow graph with compressor efficiency values and compressor speeds superimposed. A similar map depicting the performance of the turbine element of a typical turbocharger will also exist and may be utilized. As shown, map 900 is comprised of a surge line 910, choke line 920, speed lines 930 and efficiency lines 940. Surge line 910 basically represents "stalling" of the air flow at the compressor inlet. With too small a volume flow and too high a pressure ratio, the flow will separate from the suction side of the blades on the compressor wheel, with the result that the discharge process is interrupted. The air flow through the compressor is reversed until a stable pressure ratio by positive volumetric flow rate is established, the pressure builds up again and the cycle repeats. This flow instability continues at a substantially fixed frequency and the resulting behavior is known as "surging". Choke line 920 represents the maximum centrifugal compressor volumetric flow rate, which is limited for instance by the cross-section at the compressor inlet. When the flow rate at the compressor inlet or other location reaches sonic velocity, no further flow rate increase is possible and choking results. Within the boundaries of surge line 910 and choke line 920, compressor 130 may operate at any one of a plurality of speeds (represented by speed lines 930) and efficiencies (represented by efficiency lines 940). As shown, compressor efficiency ranges are depicted as oval-shaped regions that extend across a plurality of speed lines 930.

INDUSTRIAL APPLICABILITY

When a given power output is required of the engine, changing fueling or airflow is not a direct option, but will result from changing other control parameters. If an electronic wastegate is present, the wastegate setting can be adjusted (example: close the wastegate if airflow is so low the compressor is near surge, or open the wastegate if the compressor is operating too near the choke line). Proper compressor and turbine selection for the engine application should be such that operating near surge or choke means something in the engine system has failed, and controlling the engine away from such conditions should not be necessary consideration. Vane positions of variable geometry turbochargers can be adjusted to control how the turbocharger operates as well.

The disclosed thermodynamic analysis of engine sensor arrays using computer-based models in combination with a neural network has utility for a wide variety of engine analysis applications wherein real time diagnosis of general operating conditions, individual fault conditions and multiple fault conditions, are desired. One aspect of the described system is the capability to predict exhaust manifold (turbine inlet) and exhaust stack (turbine outlet) temperatures using thermodynamic modeling and compressor and turbine map information stored in the ECM. These quantities are difficult to measure with low-cost/high-reliability/fast-response sensors, thereby making virtual sensors more appealing. The described concept also eliminates the apprehension caused by placing sensors upstream of the turbine since a sensor failure that results in particles breaking off the sensor will likely result in this material passing through and damaging the turbine.

Another aspect of the described system is the capability to evaluate hardware sensors based on the output of one or more virtual sensors. If the two values are within a predetermined margin of error, the hardware sensor feedback may used. If the two values are not within the predetermined margin of error, the predicted value may used and the hardware sensor is further scrutinized to determine whether it is faulty. The hardware sensor is disabled if the difference between the actual and predicted values has exceeded a predetermined amount, a predetermined amount of times or has occurred continuously over a predetermined period of time. Operation of the engine may then be controlled based on the predicted value.

Yet another aspect of the described system is the capability to sense operating conditions, compare sensed values with empirical values, and then update the initial values and neural network weights based on the comparison. Possible benefits of the described system are warranty reduction and emissions compliance. More accurate monitoring of the engine system may allow narrower development margins for emissions, thereby allowing for better fuel economy for the end user. Moreover, effective implementation of the disclosed system could promptly identify potential damage that could occur, thereby reducing significant warranty claims against the engine manufacturer.

While the invention has been illustrated and described in detail in the drawings and foregoing description, the same is to be considered as illustrative and not restrictive in character. It should be understood that only exemplary embodiments have been shown and described and that all changes and modifications that come within the spirit of the invention are desired to be protected.

What is claimed is:

1. A method for diagnosing operation in a turbocharged engine having an engine control module (ECM) operable to control engine operation in response to data received from a plurality of sensors, the method comprising:

storing in a memory data corresponding to:
 a compressor map defining a region of compressor efficiency and compressor speeds during operation; and
 a turbine map defining a region of turbine efficiency and turbine speeds during operation;
determining a predicted value for an operating parameter measured by a first hardware sensor using data received from at least a second hardware sensor and the at least one of the compressor map and the turbine map;
determining an actual value for the operating parameter using data received from the first hardware sensor;
generating an abnormal operation signal if a difference between actual and predicted values exceeds a predetermined amount;
disabling the first hardware sensor if the difference between the actual and predicted values has exceeded the predetermined amount; and
controlling operation of an engine based on the predicted value.

2. The method of claim 1, wherein the disabling step further comprises disabling the first hardware sensor if the difference between the actual and predicted values has exceeded the predetermined amount a predetermined number of times or has occurred continuously over a predetermined period of time.

3. The method of claim 1, wherein the generating step further comprises adjusting an engine operation based on the actual value if the difference is less than the predetermined amount.

4. The method of claim 1, further comprising adjusting an engine operation based on the predicted value when the difference is greater than the predetermined amount.

5. The method of claim 1, further comprising determining whether a fault exists in the first hardware sensor.

6. A method for training an artificial neural network (ANN), the method comprising:

determining a predicted value for an operating parameter measured by a first hardware sensor using data received from the ANN;
determining an actual value for the operating parameter using data received from the first hardware sensor; and
using the actual value to train the ANN if a difference between the actual and predicted values is less than a predetermined amount.

7. The method of claim 6, further comprising:
disabling the first hardware sensor if the difference between the actual and predicted values has exceeded the predetermined amount a predetermined amount of times or has occurred continuously over a predetermined period of time; and
controlling operation of an engine based on the predicted value.

8. The method of claim 6, further comprising adjusting an engine operation using the predicted value when the difference between the actual and predicted values is greater than a predetermined amount.

9. The method of claim 6, further comprising determining whether a fault exists in the first hardware sensor.

10. A machine-readable storage medium having stored thereon machine executable instructions, the execution of said instructions adapted to implement a method for diagnosing abnormal operation in a turbocharged engine having an engine control module (ECM) operable to control engine operation in response to data received from a plurality of sensors, the method comprising:
storing in a memory data corresponding to:
a compressor map defining a region of compressor efficiency and compressor speeds during operation; and
a turbine map defining a region of turbine efficiency and turbine speeds during operation;
determining a predicted value for an operating parameter measured by a first hardware sensor using data received from at least a second hardware sensor and the at least one of the compressor map and the turbine map;
determining an actual value for the operating parameter using data received from the first hardware sensor;
generating an abnormal operation signal if a difference between actual and predicted values is greater than a predetermined amount;
disabling the first hardware sensor if the difference between the actual and predicted values has exceeded the predetermined amount a predetermined number of times or has occurred continuously over a predetermined period of time; and
controlling operation of an engine based on the predicted value.

11. The machine-readable storage medium of claim 10, wherein the generating step further comprises adjusting an engine operation based on the actual value if the difference is less than the predetermined amount.

12. The machine-readable storage medium of claim 10, further comprising:
adjusting an engine operation based on the predicted value when the difference is greater than the predetermined amount; and
determining whether a fault exists in the first hardware sensor.

13. A machine-readable storage medium having stored thereon machine executable instructions, the execution of said instructions adapted to implement a method for training an artificial neural network (ANN), the method comprising:
determining a predicted value for an operating parameter measured by a first hardware sensor using data received from the ANN;
determining an actual value for the operating parameter using data received from the first hardware sensor; and
using the actual value to train the ANN if a difference between the predicted and actual values is less than a predetermined amount.

14. The machine-readable storage medium of claim 13, further comprising:
disabling the first hardware sensor if the difference between the predicted and actual values has exceeded the predetermined amount a predetermined amount of times or has occurred continuously over a predetermined period of time; and
controlling operation of an engine based on the predicted value.

15. The machine-readable storage medium of claim 13, further comprising:
adjusting an engine operation based on the predicted value when the difference is greater than the predetermined amount; and
determining whether a fault exists in the first hardware sensor.

16. An apparatus for diagnosing abnormal operation in a turbocharged engine having an engine control module (ECM) operable to control engine operation in response to data received from a plurality of sensors, the apparatus comprising:
a microprocessor with a memory that includes data corresponding to:
a compressor map defining a region of compressor efficiency and compressor speeds during operation; and
a turbine map defining a region of turbine efficiency and turbine speeds during operation;
a module configured to determine a predicted value for an operating parameter measured by a first hardware sensor using data received from at least a second hardware sensor and the at least one of the compressor map and the turbine map;
a module configured to determine an actual value for the operating parameter using data received from the first hardware sensor;
a module configured to generate an abnormal operation signal if a difference between actual and predicted values is greater than a predetermined amount;
a module configured to disable the first hardware sensor if the difference between the actual and predicted values has exceeded the predetermined amount a predetermined number of times or has occurred continuously over a predetermined period of time; and
a module configured to control operation of an engine based on the predicted value.

17. The apparatus of claim 16, wherein the generating module further comprises a module configured to adjust an engine operation based on the actual value if the difference is less than the predetermined amount.

18. The apparatus of claim 16, further comprising:
a module configured to adjust an engine operation based on the predicted value when the difference is greater than the predetermined amount; and
a module configured to determine whether a fault exists in the first hardware sensor.

19. The apparatus of claim 16, wherein the plurality of modules comprise functionally related computer program code and data.

20. An apparatus for training an artificial neural network (ANN), the apparatus comprising:
a module configured to determine a predicted value for an operating parameter measured by a first hardware sensor using data received from the ANN;
a module configured to determine an actual value for the operating parameter using data received from the first hardware sensor; and a module configured to use the actual value to train the ANN if a difference between the predicted and actual values is less than a predetermined amount.

21. The apparatus of claim 20, further comprising:

a module configured to disable the first hardware sensor if the difference between the predicted and actual values has exceeded the predetermined amount a predetermined amount of times or has occurred continuously over a predetermined period of time; and a module configured to control operation of an engine based on the predicted value.

22. The apparatus of claim 20, further comprising:

a module configured to adjust an engine operation using the predicted value when the difference between the predicted and actual values is greater than a predetermined amount; and a module configured to determine whether a fault exists in the first hardware sensor.

23. The apparatus of claim 20, wherein the plurality of modules comprise functionally related computer program code and data.

* * * * *